United States Patent [19]

Lamb et al.

[11] Patent Number: 4,648,456

[45] Date of Patent: Mar. 10, 1987

[54] METHOD FOR ACIDIZING SILICEOUS FORMATIONS

[75] Inventors: Walter J. Lamb, The Woodlands; Kenneth R. Kunze, Houston, both of Tex.

[73] Assignee: Exxon Production Research Co., Houston, Tex.

[21] Appl. No.: 750,804

[22] Filed: Jul. 1, 1985

[51] Int. Cl.[4] .................................... E21B 43/27
[52] U.S. Cl. .................................... 166/307; 166/259; 166/305.1
[58] Field of Search ............... 252/8.55 C, 8.55 R; 166/307, 259, 281, 305.1

[56] References Cited

U.S. PATENT DOCUMENTS

| 2,225,695 | 12/1940 | Henderson et al. | 166/21 |
|---|---|---|---|
| 2,652,360 | 9/1953 | Bond et al. | 252/8.55 |
| 2,727,574 | 12/1955 | Bond | 166/38 |
| 3,794,117 | 2/1974 | Knox et al. | 166/307 |
| 3,920,566 | 11/1975 | Richardson et al. | 252/8.55 |
| 4,101,426 | 7/1978 | Maly et al. | 252/8.55 C |
| 4,136,739 | 1/1979 | Salathiel et al. | 166/307 X |
| 4,151,098 | 4/1979 | Dill et al. | 252/8.55 C |
| 4,151,878 | 5/1979 | Thomas | 166/307 |
| 4,151,879 | 5/1979 | Thomas | 166/307 |
| 4,200,154 | 4/1980 | Tate | 166/307 |
| 4,304,676 | 12/1981 | Hall | 252/8.55 C |
| 4,414,118 | 11/1983 | Murphey | 252/8.55 C |

OTHER PUBLICATIONS

C. W. Crowe & S. S. Minor, "Acid Corrosion Inhibitor Adsorption & Its Effect on Matrix Stimulation Results", SPE paper No. 10650, presented at the SPE Formation Damage Control Symposium held in Lafayette, La., Mar. 24–25, 1982.

C. M. Shaughnessy & K. R. Kunze, "Understanding Sandstone Acidizing Leads to Improved Field Practices", Journal of Petroleum Technology, Jul. 1981, pp. 1196–1202.

B. B. Williams, J. L. Gidley, R. S. Schechter, "Acidizing Fundamentals", Society of Petroleum Engineers of the American Institute of Mining, Metallurgical and Petroleum Engineers, Inc., p. 6.

Primary Examiner—Stephen J. Novosad
Assistant Examiner—Thomas J. Odar
Attorney, Agent, or Firm—D. H. Vickrey

[57] ABSTRACT

A method for improving the permeability in a subterranean formation by acid treatment is disclosed. In this method, an aqueous acidizing solution containing hydrofluoric acid and excess fluoride is injected into the formation. The acidizing solution dissolves siliceous materials and reduces precipitation of dissolved species from the spent acidizing solution. Further, the acidizing solution has lower acidity than presently employed acidizing solutions and thus a reduced tendency to corrode wellbore tubing and equipment.

11 Claims, 1 Drawing Figure

METHOD FOR ACIDIZING SILICEOUS FORMATIONS

FIELD OF THE INVENTION

This invention relates to the acid treatment of sandstones and similar subterranean formations surrounding oil wells, gas wells, injection wells and similar boreholes.

BACKGROUND OF THE INVENTION

Drilling, completion, workover, production, injection and similar operations in subterranean sandstone and siliceous formations may cause siliceous materials to migrate toward the wellbore and block the pores in the formation, thereby reducing permeability. Such subterranean formations are often referred to as "damaged". Permeability reduction, or damage, may result from different kinds of drilling and production operations. For example, "mud damage" is caused by mechanisms such as the blocking of the pores of the formation with drilling mud solids and formation fines. Acid solutions are often used to improve the permeability of such damaged sandstones and other siliceous formations surrounding oil and gas wells and thereby increase the production of fluids from these formations. The methods employed, generally referred to as sandstone acidizing processes, normally involve the injection of an aqueous solution containing a mixture of hydrochloric and hydrofluoric acids into the formation and the subsequent return production of spent acid from the formation back into the wellbore. These acidizing solutions of hydrofluoric and hydrochloric acids are routinely injected into wells in sandstone formations to dissolve and remove materials restricting flow of reservoir fluids to or from the wellbore. The reaction products of an acidizing process may be iron, silicon, or aluminum compounds or other solid dissolved species. However, formation damage can also occur by precipitation of such reaction products from spent acidizing solutions of hydrofluoric and hydrochloric acids. Acidizing solutions can also corrode tubing, casing, and downhole equipment. Consequently, there is a need for acidizing processes and solutions which have a reduced tendency to precipitate reaction products and corrode equipment.

In view of the risks involved in acidizing processes, such processes should only be used on formations in which production can be substantially improved by an acidizing treatment. The production increase which can be obtained from damage removal by acidizing can be estimated if the ratio of the damaged permeability ($k_d$) to the undamaged permeability ($k_o$) is known. (See *Acidizing Fundamentals*, B. B. Williams, J. L. Gidley and R. S. Schecter, Millet the Printer, Inc., Dallas, Tex., 1979, pg. 6) In general, unless the ratio of $k_d/k_o$ is less than about 0.5, acidizing processes will not be used to remove damage, increase permeability and thereby increase production. With a ratio of $k_d/k_o$ above about 0.5, any potential production increase would be insufficient to pay for the acidizing treatment. Also, in formations having a ratio of $k_d/k_o$ above and about 0.5, the acidizing treatment may actually damage the formation and reduce production.

It is desirable that acids injected into sandstone formations to improve formation permeability first react with the siliceous materials which block reservoir fluid flow and then maintain all reaction products dissolved in the spent acid solution. Reaction products, particularly compounds of silicon and aluminum which dissolve in the acid solution, are preferably removed from the formation with the spent acid. However, as discussed in the paper "Understanding Sandstone Acidizing Leads to Improved Field Practices" by C. M. Shaughnessy and K. R. Kunze, Journal of Petroleum Technology, July, 1981, Pages 1196 to 1202, silicon compounds precipitate from conventional acidizing solutions (5 to 28 wt.% hydrochloric acid plus 1 to 6 wt.% hydrofluoric acid) when the hydrofluoric component of the acidizing solution is spent. The previously dissolved silicon precipitates in the form of an amorphous gel which blocks the flow paths in the sandstone and may reduce permeability. The rate and severity of silicon precipitation depends on formation characteristics. For example, the rate of silicon precipitation increases as reservoir clay content and reservoir temperature increase. Also, the severity of damage increases as reservoir permeability decreases.

During an acidizing process the acidizing solution attacks the siliceous components of the reservoir. Clay minerals are particularly susceptible to attack due to their high surface area and open structure. Clays have a layered structure composed of two basic structural units, a silica sheet and an alumina sheet. The manner in which these sheets are stacked plus the degree of substitution of other elements determines the type of clay. Clays react with hydrofluoric acid to form silicon and aluminum fluorides. For example, the reaction with kaolinite clay is: $Al_2Si_2O_5(OH)_4 + 18\ HF \rightarrow 2H_2SiF_6 + 2AlF_3 + 9H_2O$. Kaolinite clay is a common reservoir mineral often responsible for formation damage. However, a distribution of reaction products will be present in a spent acidizing solution from a reservoir containing a variety of clays. Silicon fluorides exist as $SiF_4$, $SiF_5^-$, and $SiF_6^{-2}$ while the aluminum and aluminum fluorides exist as $Al^{+3}$, $AlF^{+2}$, $AlF_2^+$, $AlF_3$, $AlF_4^-$, $AlF_5^{-2}$ and $AlF_6^{-3}$.

The presence of active aluminum and aluminum fluorides in the spent or partially spent acidizing solution aggravates silicon precipitation. A spent hydrofluoric and hydrochloric acid mixture is spent in the hydrofluoric component, but still has live hydrochloric acid which continues to leach aluminum from the unreacted clay minerals and other minerals remaining in the sandstone. The leached aluminum competes with silicon for the fluoride provided by hydrofluoric acid. Since aluminum is a stronger complexer of fluoride ions than silicon, the soluble silicon fluorides are converted to insoluble silicon gels as the fluoride ions complex with the soluble aluminum. Consequently, the precipitated insoluble silicon gel deposits in the formation pores and may reduce permeability.

Various approaches to the problem of silicon precipitation have been suggested.

In Shaughnessy and Kunze, infra at page 1201, three techniques are suggested for minimizing silicon precipitation. The first suggested technique is use of an afterflush following acidizing. According to Shaughnessy and Kunze, afterflushing with diesel oil, nitrogen, HCl or ammonium chloride in water following an acidizing treatment displaces spent acidizing solution from the critical region very close to the well. Any damage to the reservoir caused by silicon precipitation is far enough from the wellbore to have a reduced effect on flow capacity. However, an afterflush has some disadvantages. It is an added expense and may aggravate a temporary water block. It must be pumped soon after acidizing to be most effective. Also, some damage from silicon precipitation still occurs. The second technique for reducing silicon precipitation suggested by Shaughnessy and Kunze is to return the well to production immediately after acidizing. However, such a technique is inapplicable to situations where immediate production is either undesirable or impossible due to operational constraints or reservoir limitations. The third technique suggested by Shaughnessy and Kunze is particularly for high-temperature wells (above 95° C. or 200° F.). In such wells, reduced hydrofluoric acid concentration is recommended to reduce silicon precipitation. However, acidizing with lower hydrofluoric acid concentration only delays silicon precipitation while reducing the dissolving power of the acid.

In U.S. Pat. No. 2,225,695 (Henderson et al) a method for acid treating a subterranean formation is disclosed. The formation is first acidized with a 24 to 60 weight percent hydrofluoric acid solution. A gelatinous aggregate of reaction products is allowed to precipitate. Then an agent, such as hydrochloric acid, is injected into the formation to dissolve the precipitate. This two step process results in extra time and expense in treating the formation. Furthermore, blockage caused by precipitation limits contacting all of the precipitated material for removal.

In addition to aggravating formation damage due to silicon and aluminum precipitation, conventional acidizing solutions also have a tendency to corrode tubing, casing and downhole equipment, such as gravel pack screens and downhole pumps. This is particularly true of conventional acidizing solutions of hydrofluoric and hydrochloric acids which are typically low pH, high acidity solutions. Further, the iron which is removed by equipment corrosion during an acidizing process may precipitate in the formation and cause additional damage.

The acidizing process in a gas well makes downhole equipment particularly sensitive to low pH acidizing solutions in that some spent acidizing solution may be left in the wellbore after the well is put back on production. The spent acidizing solution may contain live HCl which is circulated by and through the tubing and downhole equipment during production, increasing the opportunity for corrosion of equipment.

Some corrosion problems may be alleviated by the use of a corrosion inhibitor with the conventional acidizing solution. However, corrosion inhibitors provide only short-term protection. Further, corrosion inhibitors reduce oil production by adsorbing on the rock matrix, changing the rock from water-wet to oil-wet and thereby reducing relative permeability (C. W. Crowe, S. S. Menor, SPE 10650, p. 59 (1982)). Corrosion inhibitors are also difficult to use in that they are only dispersible in the acidizing solution and have a tendency to undergo phase separation.

Corrosion problems are aggravated in high temperature (greater than about 250° F.) wells where heat increases the rate of corrosion. Also, corrosion inhibitors are not as effective at high temperatures as they are at low temperatures.

Therefore, the need exists for an acidizing solution which will increase formation permeability without creating precipitation and corrosion problems.

SUMMARY OF THE INVENTION

We have found a composition and methods for improving the permeability of a subterranean formation comprising injecting into the formation an aqueous acidizing solution containing hydrofluoric acid and dissociated fluoride ions in excess of the amount of fluoride ions stoichiometrically required to form hydrofluoric acid. Additionally, these hydrofluoric acid and fluoride solutions may contain a complexing agent to maintain dissolved aluminum in solution. The method of the current invention is especially useful in formations having temperatures above about 250° F.

DETAILED DESCRIPTION OF THE INVENTION

Figure 1:
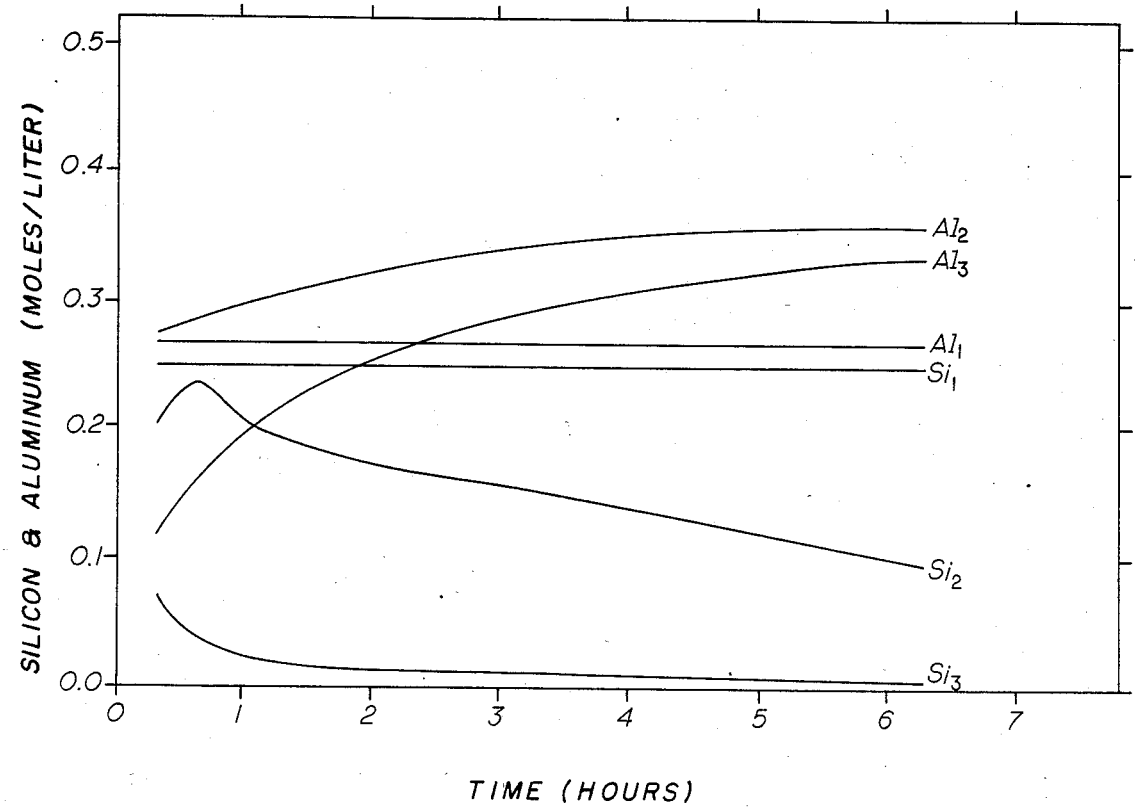
FIG. 1 is a graph of silicon and aluminum concentrations verses time for various sandstone acidizing solutions.

The present invention is a method for improving the permeability of a subterranean sandstone formation by dissolving minerals or removing damage in the formation with an acidizing solution which is less corrosive to steel tubulars and equipment than currently employed acidizing solutions. In the method of the present invention, hydrofluoric acid solutions which initially contain excess fluoride are injected into the formation. The term "excess fluoride" as used herein refers to dissociated fluoride ions present in the acidizing solution in addition to the fluoride ions stoichiometrically required to form hydrofluoric acid. Compared to conventional acidizing formulations, the solutions of the present invention have excess fluoride which slows the rate of silicon precipitation and a higher pH which reduces the rate of aluminum leaching and reduces equipment corrosion.

In a preferred embodiment, the hydrofluoric acid compositions contain an initial mole ratio of hydrofluoric acid to excess fluoride in the range of about 2 to about 6. The acidizing solution contains excess fluoride so the dissolved silicon and aluminum will remain dissolved in and be removed with the spent acidizing solution. When the mole ratio of hydrofluoric acid to excess fluoride is less than about 2, dissolved aluminum precipitates in the formation. Such aluminum precipitation may cause further formation damage or otherwise reduce the benefits of the acidizing process. When this ratio is greater than about 6, silicon precipitates. Again, silicon precipitation may cause formation damage. Thus the initial mole ratio of hydrofluoric acid to excess fluoride should be in the range of about 2 to about 6. It has been found that the most effective ratio for the current invention is about 4.

The preferred method of preparing an acidizing solution of the current invention comprises dissolving an effective amount of ammonium bifluoride ($NH_4HF_2$) in an aqueous solution, then adding a strong acid to the aqueous ammonium bifluoride solution in an amount stoichiometrically determined to leave excess fluoride in solution. In one embodiment, oxalic acid is the strong acid employed since oxalic acid will complex dissolved aluminum and aid in the prevention of aluminum precipitates. Oxalic acid is an effective complexing agent, but any complexing agent which reacts effectively with aluminum in the pH range of about 2 to about 7 may be used. The complexing agent is added at the maximum concentration that is soluble in the initial hydrofluoric acid solution and will remain soluble in the spent acidizing solution.

The quantities of hydrofluoric acid, excess fluoride, and aluminum complexing agent contained in the acidizing solution will depend in part on the mineral composition and physical geometry (such as interval length, fracture network, and permeability) of the reservoir being acidized. These quantities may also vary with the manner in which the invention is carried out.

The current invention may be carried out by injecting a hydrofluoric acid solution containing excess fluoride into the producing formation surrounding the wellbore. It is normally preferred that the injection pressure be kept below that necessary to fracture the formation so that penetration of the acid into the formation matrix occurs. The injection rate selected should generally be sufficient to keep the pressure just below that necessary to fracture the formation. To achieve maximum penetration of live acid, the rate should normally be increased as the damage is removed due to acid attack. If the interval being treated is more than about twenty feet in thickness or if more than fifty perforations are open to the wellbore, it may be advisable to practice a method of diversion to promote uniform treatment of the productive intervals.

The nature and objects of the invention are further illustrated by the results of three stirred reactor tests. The composition of the acidizing solutions used in these three tests are listed below.

ticularly analyzed for silicon and aluminum which are present at a one-to-one mole ratio in pure kaolinite clay.

The acidizing solution of Test No. 3 is a conventional hydrofluoric acid formulation. FIG. 1 shows that for such conventional formulations substantial amounts of silicon precipitate out of solution while aluminum leaching continues to occur. Test No. 2 illustrates the improvement encountered with the use of excess fluoride in an acidizing solution. The amount of silicon precipitation is substantially reduced as indicated by the amount of silicon remaining in solution. Finally, Test No. 1 shows that the addition of oxalic acid to an acidizing solution containing hydrochloric acid and excess fluoride results in no precipitation of either silicon or aluminum during a six hour period at 150° F. Also referring to FIG. 1, it should be noted that the dissolving power of the acidizing solutions of Test Nos. 1 and 2 is comparable to the conventional hydrofluoric acid solution of Test No. 3, depending primarily on the moles of hydrogen fluoride in the solution.

In addition to these stirred reactor tests, core flood tests were conducted to demonstrate the effectiveness of the methods and compositions of the current invention. Various acidizing processes were performed on mud-damaged Bandera sandstone cores. Additionally, coupon tests were performed to demonstrate the corrosivity of several acidizing solutions under varying conditions.

TABLE II

ACIDIZING TESTS ON MUD-DAMAGED BANDERA SANDSTONE CORES

| Core No. | Acidizing Solution | Core Effluent Silicon Conc. Before | Core Effluent Silicon Conc. After | Core Effluent Aluminum Conc. Before | Core Effluent Aluminum Conc. After | pH | Permeability (md) Before Acidizing Sec. 1 0"-2" ($k_1$) | Permeability (md) Before Acidizing Sec. 2 2"-4" ($k_2$) | Permeability (md) Before Acidizing Sec. 3 4"-6" ($k_3$) | $k_d/k_o$ Before Acidizing | Permeability Ratio ($k_f/k_d$) Sec. 1 0"-2" | Permeability Ratio ($k_f/k_d$) Sec. 2 2"-4" | Permeability Ratio ($k_f/k_d$) Sec. 3 4"-6" | Overall 0"-6" |
|---|---|---|---|---|---|---|---|---|---|---|---|---|---|---|
| 1 | 12% HCl; 3% HF (Conventional Solution) | 0.28 | 0.078 | 0.56 | 1.1 | 0 | 0.82 | 6.7 | 2.3 | 0.34 | 49 | 1.8 | 2.3 | 6.2 |
| 2 | 1.5% HF; 0.75% NH$_4$F | 0.10 | 0.10 | 0.041 | 0.036 | 3.8 | 0.26 | 9.0 | 7.1 | 0.16 | 27 | 0.77 | 0.59 | 7.8 |
| 3 | 1.5% HF; 0.75% NH$_4$F; 0.15 M Oxalic Acid | 0.071 | 0.052 | 0.035 | 0.027 | 5.7 | 0.36 | 11.0 | 5.7 | 0.16 | 17 | 0.50 | 0.24 | 2.7 |
| 4 | 6% HCl; 1.5% HF (Conventional Solution) | 0.038 | 0.038 | 0.27 | 0.28 | 0 | 0.41 | 8.5 | 5.8 | 0.25 | 40 | 1.2 | 0.71 | 7.3 |

TABLE I

STIRRED REACTOR TESTS WITH ACIDIZING SOLUTIONS

| Test No. | Acidizing Solution Composition |
|---|---|
| 1 | 1.6 M HF, 0.4 M excess F and 0.3 M oxalic acid |
| 2 | 1.6 M HF and 0.4 M excess F |
| 3 | 0.4 M HF and 1.0 M HCl (Conventional Solution) |

Each acidizing solution was separately tested in a stirred reactor with kaolinite clay. The tests were performed at 150° F. which is a typical reservoir temperature. At this temperature, hydrofluoric acid is spent in about five minutes. With each of the three acidizing solutions, samples of the spent acidizing solution were periodically removed and analyzed to monitor the precipitation of reaction products. The samples were par- To demonstrate the ability of the current method to improve the permeability of damaged formations, four Bandera sandstone cores 6" long and 1½" in diameter were chosen to be mud-damaged and acid treated. All four cores had a ratio of damaged permeability to undamaged permeability ($k_d/k_o$) below 0.5. This indicates that, by field standards, the cores were good candidates for acidizing treatment.

The four cores each were first sealed with inert epoxy. Each sealed core was then placed in the fusable metal alloy sleeve of a coreholder. Four pressure taps at 2" intervals were placed along each core to measure in-situ permeability changes. The tap at the input face and the taps at 2", 4" and 6" from the input face produced, respectively, Sections 1, 2 and 3 in each core. To simulate field operations, the procedures below were followed with each core.

1. 10% NaCl was pumped through each core to establish initial permeability. 15% HCl (9 pore volumes)

was pumped through each core to remove carbonates. 3% NH$_4$Cl was pumped through each core to measure permeability increase due to HCl. Since HCl removes only carbonates in the sandstone (such as CaCO$_3$ and CaMg(CO$_3$)$_2$), early removal of the carbonates will insure that subsequent permeability increases are due, for the most part, to dissolution by the acidizing solution.

2. To simulate mud damage, about 50 ml (approximately 2 pore volumes) of a suspension of smectite clay in fresh water were pumped through each core. Smectite clay is a common reservoir mineral and drilling fluid component often responsible for damage.

3. To simulate the HCl present in the sandstone after preflushing operations, each core was resaturated with 70 ml (2 pore volumes) 15% HCl.

4. To simulate the acidizing process, about 230 ml (8 pore volumes) of acidizing solution were pumped through each core against a back pressure of 200 psi at 150° F. The particular acidizing solution formulation pumped through each core is listed in Table II below.

5. The acidizing solution was shut-in for 2 hours in each core.

6. The permeabilities of Sections 1, 2 and 3 were measured before and after treatment with acidizing solution. The results of these measurements are contained in Table II.

Referring to Table II, k$_1$, k$_2$ and k$_3$ are the permeabilities of successive two inch segments of each core after mud damage and before acidizing by the methods of the current invention. Comparison of k$_1$ to k$_2$ and k$_3$ indicates that major permeability reduction occurred in the first two inches of each core, producing relatively shallow damage. Such shallow damage often occurs in the formation surrounding injection and production wells. Thus, the core tests reported in Table II simulate damage removal in the critical near-wellbore region and in regions beyond the near-wellbore.

Core Nos. 1 and 4 were acidized using the above described method with conventional acidizing solutions (12% HCl; 3% HF and 6% HCl; 1.5% HF). Core Nos. 2 and 3 were acidized using the method and acidizing solutions of the current invention. The method and compositions employed in all four cores substantially increased the overall permeability (0"-6") of each core. In particular, as indicated by the permeability ratio, the ratio of the after-acidizing permeability (k$_f$) to the damaged permeability (k$_d$), for all four cores, the greatest incremental permeability increase for each core was in Section 1 (0"-2"), the area of most damage.

The pH of the acidizing solutions used in the process of the current invention is higher than the pH of conventional acidizing solutions. The advantages obtained by the higher pH (lower acidity) and excess fluoride acidizing solutions of the current invention include a reduced rate of corrosion of tubing and steel equipment and a reduced rate of silicon precipitation and aluminum leaching. This extends the applicability of the acidizing formulation of the current invention to high temperature wells where the corrosion rate resulting from conventional acidizing formulations is difficult to control.

Coupon tests were performed to demonstrate the reduced tendency of the methods and acidizing solutions of the current invention to corrode steel. Test coupons of L-80 steel were placed in various acidizing solutions for 5 hours under temperature and pressure conditions of either 150° F. and 500 psi or 400° F. and 1000 psi. Referring to Table III, Solution Nos. 1 and 4 are those used in a conventional acidizing process. Solution Nos. 2, 3, 5 and 6 are those of the current invention. Within experimental error, the weight loss encountered at 150° F. and 500 psi with all three acidizing solutions is approximately the same. However, at 400° F. and 1000 psi, the weight loss (and therefore corrosivity) occurring with the conventional acidizing solutions (Solution No. 4) is about 200 times greater than that occurring with Solution Nos. 5 and 6 of the current invention. Thus, the acidizing methods and solutions of the current invention increase permeability and, under certain conditions, are less corrosive than the acidizing solutions used in conventional methods.

TABLE III

COUPON TESTS

| Solution No. | Acidizing Solution Composition | Temperature (F) | Pressure (psi) | Weight Loss (grams) |
|---|---|---|---|---|
| 1 | 12% HCL; 3% HF | 150° | 500 | 0.6 |
| 2 | 3% HF; 1.5% NH$_4$F | 150° | 500 | 1.4 |
| 3 | HF; 1.5% NH$_4$F; 0.3 M Oxalic Acid | 150° | 500 | 0.0 |
| 4 | 12% HCl; 3% HF | 400° | 1000 | 45.0 |
| 5 | 3% HF; 1.5% NH$_4$F | 400° | 1000 | 0.2 |
| 6 | 3% HF; 1.5% NH$_4$F; 0.3 M Oxalic Acid | 400° | 1000 | 0.3 |

Thus, the present invention provides an acidizing method for increasing the permeability or removing damage in a subterranean formation by employing an acidizing solution containing hydrofluoric acid, excess fluoride, and optionally an aluminum complexing agent. This method is effective for dissolving sandstone minerals and maintaining such dissolved minerals in solution for removal with the spent acidizing solution.

Various modifications and alterations in the practice of this invention will be apparent to those skilled in the art without departing from the scope and spirit of this invention. Although the invention was described in connection with specific preferred embodiments, it should be understood that the invention as claimed should not be unduly limited to such specific embodiments.

We claim:

1. A method for treating a subterranean formation surrounding a wellbore which comprises injecting into said formation an aqueous acidizing solution, said aqueous acidizing solution containing hydrofluoric acid and excess fluoride, said excess fluoride present in an amount greater than the amount of fluoride stoichiometrically required to form hydrofluoric acid, and thereafter producing fluids from said wellbore.

2. The method of claim 1 wherein the initial mole ratio of hydrofluoric acid to excess fluoride is from about 2 to about 6.

3. A method for improving the permeability of a damaged subterranean formation surrounding a wellbore which comprises injecting into said formation an aqueous acidizing solution, said aqueous acidizing solution containing hydrofluoric acid and excess fluoride, said excess fluoride present in an amount greater than the amount of fluoride stoichiometrically required to form hydrofluoric acid, and thereafter producing fluids from said wellbore.

4. The method of claim 3 wherein the initial mole ratio of hydrofluoric acid to excess fluoride is from about 2 to about 6.

5. A method for improving the permeability of a subterranean formation surrounding a wellbore which comprises injecting into said formation an aqueous acidizing solution, said aqueous acidizing solution containing hydrofluoric acid, excess fluoride and a carboxylic acid, said excess fluoride present in an amount greater than the amount of fluoride stoichiometrically required to form hydrofluoric acid, and thereafter producing fluids from said wellbore.

6. The method of claim 5 wherein the initial mole ratio of hydrofluoric acid to excess fluoride is from about 2 to about 6.

7. The method of claim 5 wherein the carboxylic acid is oxalic acid.

8. A method for improving the permeability of a subterranean formation surrounding a wellbore which comprises injecting into said formation an aqueous acidizing solution containing hydrofluoric acid, excess fluoride, and an aluminum complexing agent, said excess fluoride present in an amount greater than the amount of fluoride stoichiometrically required to form hydrochloric acid and thereafter producing fluids from said wellbore.

9. The method of claim 8 wherein the initial mole ratio of hydrofluoric acid to excess fluoride is from about 2 to about 6.

10. The method of claim 8 wherein said aluminum complexing agent is a carboxylic acid.

11. The method of claim 10 wherein said carboxylic acid is oxalic acid.

* * * * *